(12) United States Patent
Homan et al.

(10) Patent No.: US 7,183,778 B2
(45) Date of Patent: Feb. 27, 2007

(54) APPARATUS AND METHOD TO MEASURE FLUID RESISTIVITY

(75) Inventors: Dean M. Homan, Sugar Land, TX (US); Andrew Hieu Cao, Houston, TX (US); Brian Clark, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 11/184,527

(22) Filed: Jul. 19, 2005

(65) Prior Publication Data

US 2007/0018659 A1   Jan. 25, 2007

(51) Int. Cl.
G01R 27/08 (2006.01)
(52) U.S. Cl. .................... 324/693; 324/691
(58) Field of Classification Search ........... 324/342, 324/693, 691
See application file for complete search history.

(56) References Cited

U.S. PATENT DOCUMENTS

| | | | |
|---|---|---|---|
| 3,404,335 A | | 7/1965 | Beckman |
| 4,282,487 A | | 8/1981 | Warren et al. |
| 4,860,581 A | | 8/1989 | Zimmerman et al. |
| 4,936,139 A | | 6/1990 | Zimmerman et al. |
| 5,463,320 A | * | 10/1995 | Bonner et al. ............... 324/366 |
| 6,801,039 B2 | * | 10/2004 | Fabris et al. ................. 324/324 |
| 6,927,578 B2 | * | 8/2005 | Homan et al. ............... 324/342 |
| 6,956,376 B2 | | 10/2005 | Salamitou |
| 6,995,563 B2 | | 2/2006 | Talutis |
| 2004/0104341 A1 | | 6/2004 | Betancourt et al. |
| 2005/0001624 A1 | | 1/2005 | Ritter et al. |
| 2005/0200370 A1 | * | 9/2005 | Quackenbuch et al. ...... 324/691 |
| 2005/0218898 A1 | * | 10/2005 | Fredette et al. ............. 324/342 |

FOREIGN PATENT DOCUMENTS

| | | | |
|---|---|---|---|
| GB | 2130727 | | 6/1984 |
| GB | 2220494 A | * | 1/1990 |
| JP | 09329633 | | 12/1997 |

* cited by examiner

*Primary Examiner*—Walter Benson
(74) *Attorney, Agent, or Firm*—Osha Liang; Bryan L. White; Kevin P. McEnaney (57) ABSTRACT

An apparatus for measuring fluid resistivity includes a flow line adapted to be in fluid communication with formation fluids, wherein the flow line includes a first section comprising a first conductive area, a second section comprising a second conductive area, and an insulating section disposed between the first section and the second section to prevent direct electrical communication between the first section and the second section; a first toroid and a second toroid surrounding the flow line around the first section and the second section, respectively, wherein the first toroid is configured to induce an electrical current in a fluid in the flow line and the second toroid is configured to measure the electrical current induced in the fluid in the flow line; and an electronic package to control functions of the first toroid and the second toroid.

16 Claims, 8 Drawing Sheets

APPARATUS AND METHOD TO MEASURE FLUID RESISTIVITY

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF INVENTION

Boreholes are drilled into the Earth's formation to recover deposits of hydrocarbons and other desirable materials trapped in the formations below. Typically, a well is drilled by connecting a drill bit to the lower end of a series of coupled sections of tubular pipe known as a drillstring. Drilling fluids, or mud, are pumped down through a central bore of the drillstring and exit through ports located at the drill bit. The drilling fluids act to lubricate and cool the drill bit, to carry cuttings back to the surface, and to establish sufficient hydrostatic "head" to prevent formation fluids from "blowing out" the borehole once they are reached. When the borehole is drilled deep enough to reach a point of interest, operations to perforate and fracture the subterranean formation are performed to enable hydrocarbons, if present, to flow from the formation into the newly drilled borehole. Because the hydrostatic pressure of the column of drilling mud can be higher than the reservoir pressures of the hydrocarbons, the hydrocarbons may not flow from the formation into the borehole on their own. Before full-scale recovery operations are commenced, drilling and production operators prefer to test the formation fluids to ensure the proper type and quantity of hydrocarbons are present in the formation before completing the well. Once the formation fluids are properly identified, various operations to retrieve the hydrocarbons therein will be performed.

To test the fluids, a formation tester is typically deployed downhole. Various formation fluid testers for wireline and logging-while-drill applications are known in the art, including the modular dynamic tester sold under the trade name of MDT™ by Schlumberger Technology Corp. (Houston, Tex.). Detailed description of these tools may be found in U.S. Pat. Nos. 4,860,581 and 4,936,139 issued to Zimmerman et al. and U.S. Published Patent Application No. 2004/0104341, by Betancourt et al. These patents and application are assigned to the assignee of the present application and are incorporated by reference in their entireties.

Figure 1:
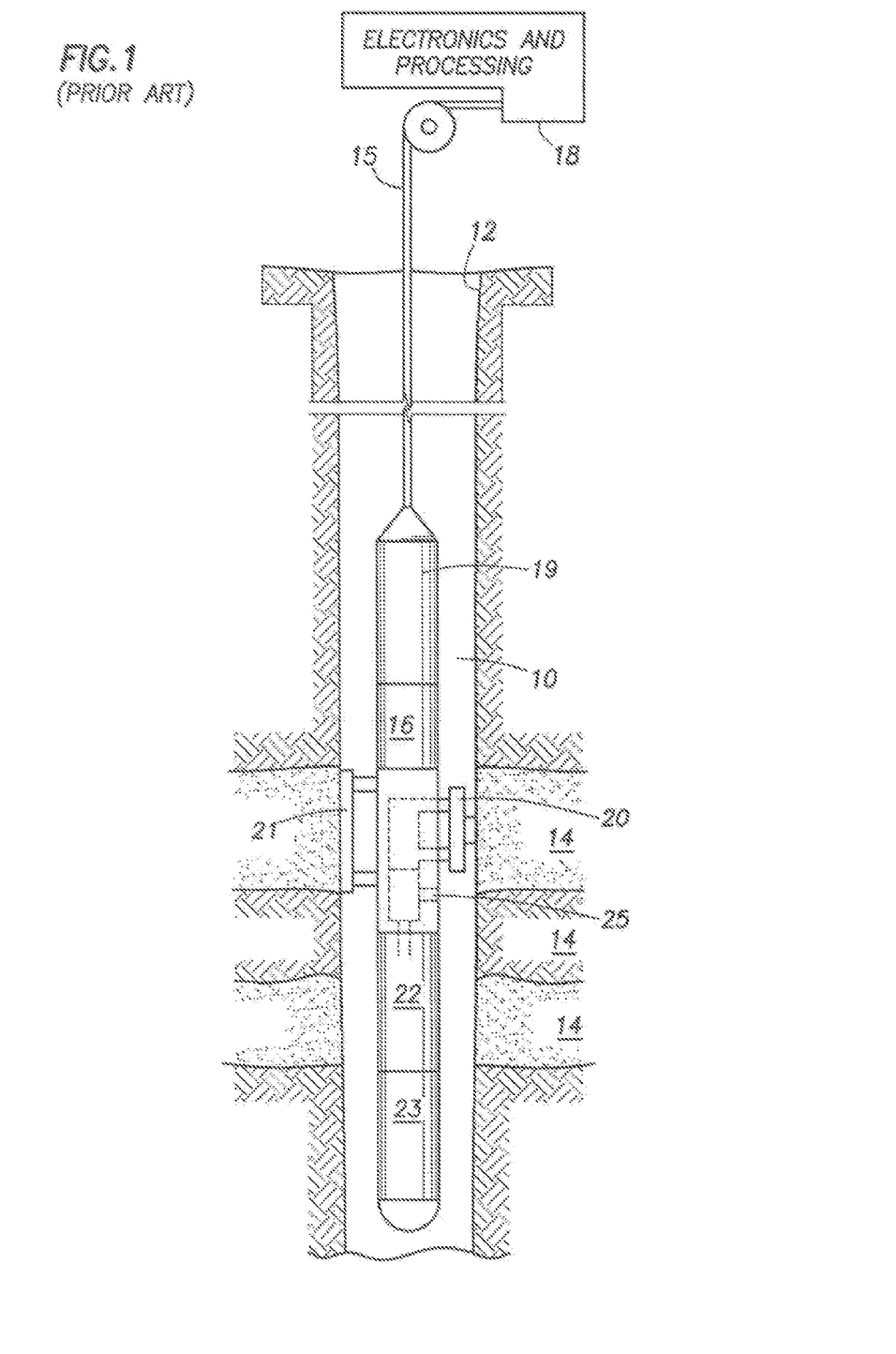
FIG. 1 shows a schematic of a prior art formation tester disposed in a wellbore.

FIG. 1 illustrates a schematic of a formation tester 10 suspended in the borehole 12 from the lower end of a typical multiconductor cable 15 that is spooled in a usual fashion on a suitable winch (not shown) on the formation surface. The cable 15 is electrically coupled to an electrical control system 18 on the formation surface. The tool 10 includes an elongated body 19 which encloses the downhole portion of the tool control system 16. The elongated body 19 also carries a selectively extendable fluid admitting assembly 20 and a selectively extendable tool anchoring member 21 which are respectively arranged on opposite sides of the tool body. The fluid admitting assembly 20 is equipped for selectively sealing off or isolating selected portions of the wall of the borehole 12 such that pressure or fluid communication with the adjacent earth formation 14 is established. Also included with tool 10 are means for determining the downhole pressure and temperature (not shown) and a fluid analysis module 25 through which the fluid flows. The fluid may thereafter be expelled through a port (not shown), or it may be sent to one or more fluid collecting chambers 22 and 23, which may receive and retain the fluids obtained from the formation. Control of the fluid admitting assembly, the fluid analysis section, and the flow path to the collecting chambers is maintained by the electrical control systems 16 and 18. As will be appreciated by those skilled in the art, the electrical control systems may include one or more microprocessors, associated memory, and other hardware and/or software to implement the invention.

Figure 2:
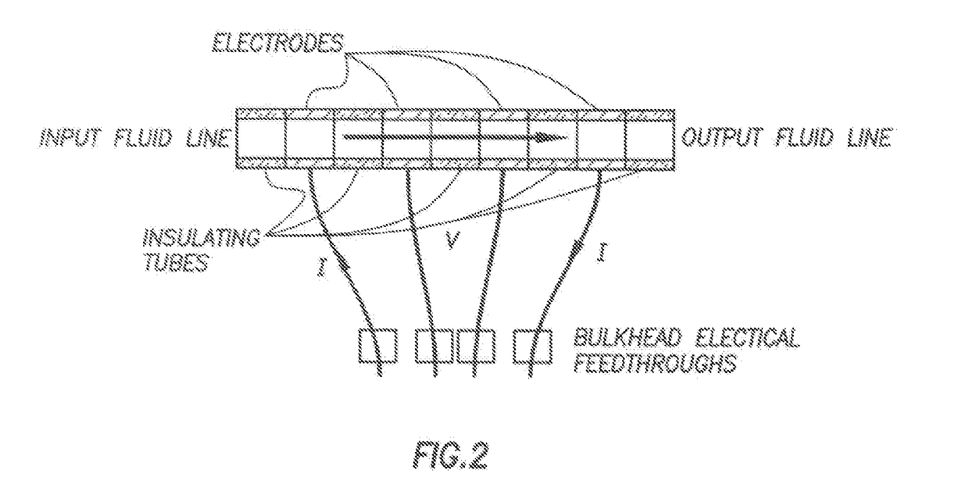
FIG. 2 shows a schematic of a prior art resistivity sensor having four electrodes.

Before formation samples are collected into collecting chambers 22 and 23, it is desirable to be certain that the fluids are from the virgin formation, i.e., not contaminated by drilling fluid from the invaded zone. To ensure that virgin formation fluids are collected, a fluid analyzer 25 is used to monitor the properties of the fluids while they are being drawn. The fluid analysis module 25 may be an optical module, a pressure sensor module, a resistivity module, or the like. Among these, the resistivity module is particularly useful because of its wide dynamic range. A typical resistivity module may include several electrodes that are in contact with the fluid. These electrodes are used to inject currents into the fluid and to measure the voltage drop over a distance. An example of such a module is disclosed in FIG. 1 (item 56) of U.S. Pat. No. 4,860,581, issued to Zimmerman. FIG. 2 shows one example of such a module (sensor).

As shown in FIG. 2, the fluid resistivity is determined by a four electrode sensor, where the four electrodes are short metal tubes separated from each other and from the input and output flow lines by short insulating tubes. The two outermost electrodes inject an electrical current (I) into the fluid sample, while the voltage drop (V) between the two innermost electrodes is measured. With a known current (I) and the measured voltage (V), the resistivity of the fluid is obtained.

However, these electrode devices are exposed to the fluids in the flow line that can be relatively high pressures (up to 30,000 psi). Therefore, good seals (e.g., bulkhead, o-rings or other mechanical seals) are necessary to protect the electronic parts that are outside the flow line and are at atmosphere pressure (about 14 psi). As boreholes drilled at such depths are often at the smallest gauge diameter, such measurement equipment and the sealing mechanisms (bulkhead and o-rings) are necessarily of a very small form factor. In the limited volume available for the resistivity sensor, it is difficult to achieve pressure seals between all of the insulated tubes and metal tubes. For a sensor shown in FIG. 2, at least eight seals would be needed; ten are needed including the seals between the outermost insulating tubes and the input and output fluid lines. Instead, four bulkhead electrical feed-throughs are used for the four wires connecting the electrodes to the electronics. At extreme temperatures and pressures, even the four bulkhead feed-throughs can be unreliable. As a result, there is great difficulty in producing a reliable resistivity sensor.

Therefore, there still exists a need for methods and apparatus for resistivity measurement that may be reliably used in formation testers or similar downhole equipment.

SUMMARY OF INVENTION

An aspect of the invention relates to apparatus for measuring fluid resistivity. An apparatus for measuring fluid resistivity in accordance with one embodiment of the invention includes a flow line adapted to be in fluid communication with formation fluids, wherein the flow line includes a first section comprising a first conductive area, a second section comprising a second conductive area, and an insulating section disposed between the first section and the second section to prevent direct electrical communication between the first section and the second section, wherein the first conductive area and the second conductive area are configured to contact a fluid contained in the flow line such that, together with a conductive path disposed outside the flow line, a current return loop is formed; a first toroid and a second toroid surrounding the flow line, wherein the first toroid is configured to induce an electrical current in the fluid in the flow line and the second toroid is configured to measure the electrical current induced in the fluid in the flow line; and an electronic package to control functions of the first toroid and the second toroid.

An aspect of the invention relates to apparatus for measuring fluid resistivity. An apparatus in accordance with one embodiment of the invention includes a flow line adapted to be in fluid communication with formation fluids, wherein the flow line is made of an insulating material; a first toroid and a second toroid surrounding the flow line and spaced apart along the flow line, wherein the first toroid is configured to induce an electrical current in a fluid contained in the flow line and the second toroid is configured to measure the electrical current induced in the fluid; a metallic housing enclosing the first toroid, the second toroid, and a section of the flow line, wherein the metallic housing is configured to provide a return current path for the electrical current induced in the fluid; and an electronic package to control functions of the first toroid and the second toroid.

Another aspect of the invention relates to methods for measuring resistivity of a formation fluid in a borehole. A method in accordance with one embodiment of the invention includes flowing the formation fluid through a flow line of a resistivity measurement apparatus, the flow line including an insulating section between a first conductive section and a second conductive section; inducing an electrical current in the formation fluid in the flow line with a first toroid; and measuring the electrical current induced in the formation fluid with a second toroid.

Other aspects and advantages of the invention will be apparent from the following description and the appended claims.

DETAILED DESCRIPTION

Embodiments of the invention relate to a resistivity sensor suitable for use in a formation tester or similar equipment. A resistivity sensor in accordance with embodiments of the invention does not rely on electrodes that are in direct contact with the fluids for resistivity measurement. Instead, a resistivity sensor in accordance with embodiments of the invention uses toroids to inductively measure the resistivity of the fluids in a flow line. A resistivity sensor in accordance with embodiments of the invention may be used in a fluid analyzer of a formation tester (e.g., 25 in FIG. 1).

Figure 3:
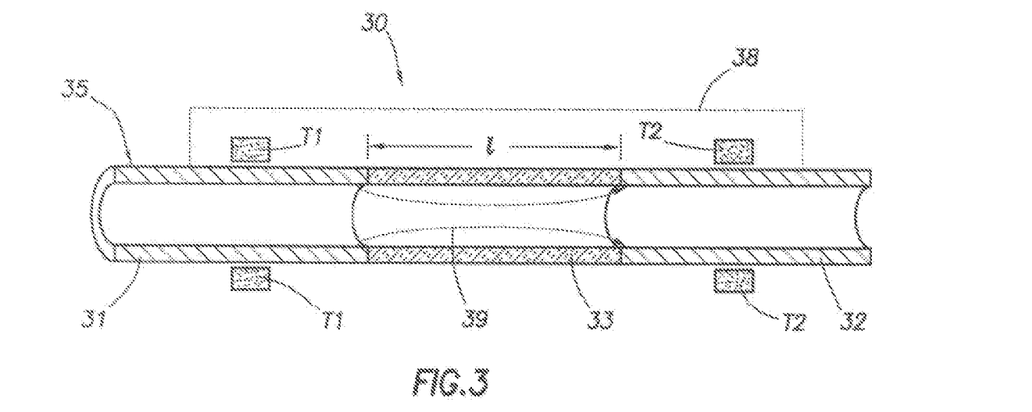
FIG. 3 shows a schematic of a toroid resistivity sensor in accordance with one embodiment of the invention.

FIG. 3 shows a schematic of a toroid-based resistivity sensor in accordance with one embodiment of the invention. As shown in FIG. 3, the resistivity sensor 30 includes a flow line 35 that is comprised of an insulating segment 33 flanked by two conductive segments 31, 32. Note that the insulating segment 33 is shown to be made entirely of an electrically insulating material (e.g., ceramic, glass, PEEK, etc.), while the conductive segments 31, 32 are entirely made of a conductive material (e.g., metal). However, one of ordinary skill in the art would appreciate that the insulating segment 33 may also comprise a conductive body with an insulating coating on the inner surface provided there is not a continuously conductive path along its length that allows current to flow between conductive segments 31 and 32. Similarly, the conductive segments 31, 32 may also be made of a non-conductive material with a conductive coating on the inner surface. Various modifications of the construction of a flow line in accordance with embodiments of the invention will be illustrated with several examples in a later section, with reference to FIGS. 5–10.

Referring again to FIG. 3, two toroids T1, T2 are disposed around (or circumscribing) the conductive segments 31, 32. One of ordinary skill in the art would know that a toroid comprises a donut-shaped core, which is typically made of a ferrite or other ferromagnetic material, and conductive wire windings on the core. When a current is passed through the conductive wire winding, a magnetic field is induced. The induced magnetic field, which is substantially aligned with the circular path of the core, can induce a current in a conductive material surrounded by the core. The induced current flows in a direction parallel with the axis of the core.

Thus, when toroid T1 is energized, it inductively induces a current in the fluids in the flow line 35. The presence of an insulating segment 33 prevents the induced electric current from lowing directly from the first conductive segment 31 to the second conductive segment 32 and forces the induced current to flow through the fluid column contained in the insulating segment 33 (shown as dotted arrows 39) to reach the second conductive segment 32. A current return path 38 then allows the current to return to the conductive segment 31 and completes the circuit. The current induced in the second conductive segment 32 and the fluid therein in turn inductively induces a current (or voltage) in the second toroid T2. The current or voltage detected in toroid T2 may be compared with the current (or voltage) applied to toroid T1 to calculate a resistance of the fluid ($R_f$) across the insulating segment 33. This resistance ($R_f$) is a function of the resistivity of the fluid ($\rho_f$), the cross section area (A) of the flow line 35, and the length (l) of the insulating segment 33. That is, $R_f = K \times \rho_f \times l/A$, where K is a constant that depends on the geometry and has a value close to 1. K can be determined from a one-time calibration using a fluid with a known resistivity. Accordingly, the resistance ($R_f$) can be determined from the measured voltage. Hence, the resistivity of the fluid ($\rho_f$) may be obtained from the known length (l) of the insulating segment 33, and known cross section (A) area of the flow line 35, and the known factor K. Details of such calculation will be described later with reference to FIGS. 12 and 13.

A resistivity sensor (or apparatus) as illustrated in FIG. 3 may be incorporated into various downhole tools to measure fluid resistivity in a flow line. One example, as illustrated in the following description, is to incorporate such a resistivity sensor in a fluid analysis module (shown as 25 in FIG. 1) of a formation tester (e.g., MDT™).

Figure 4:
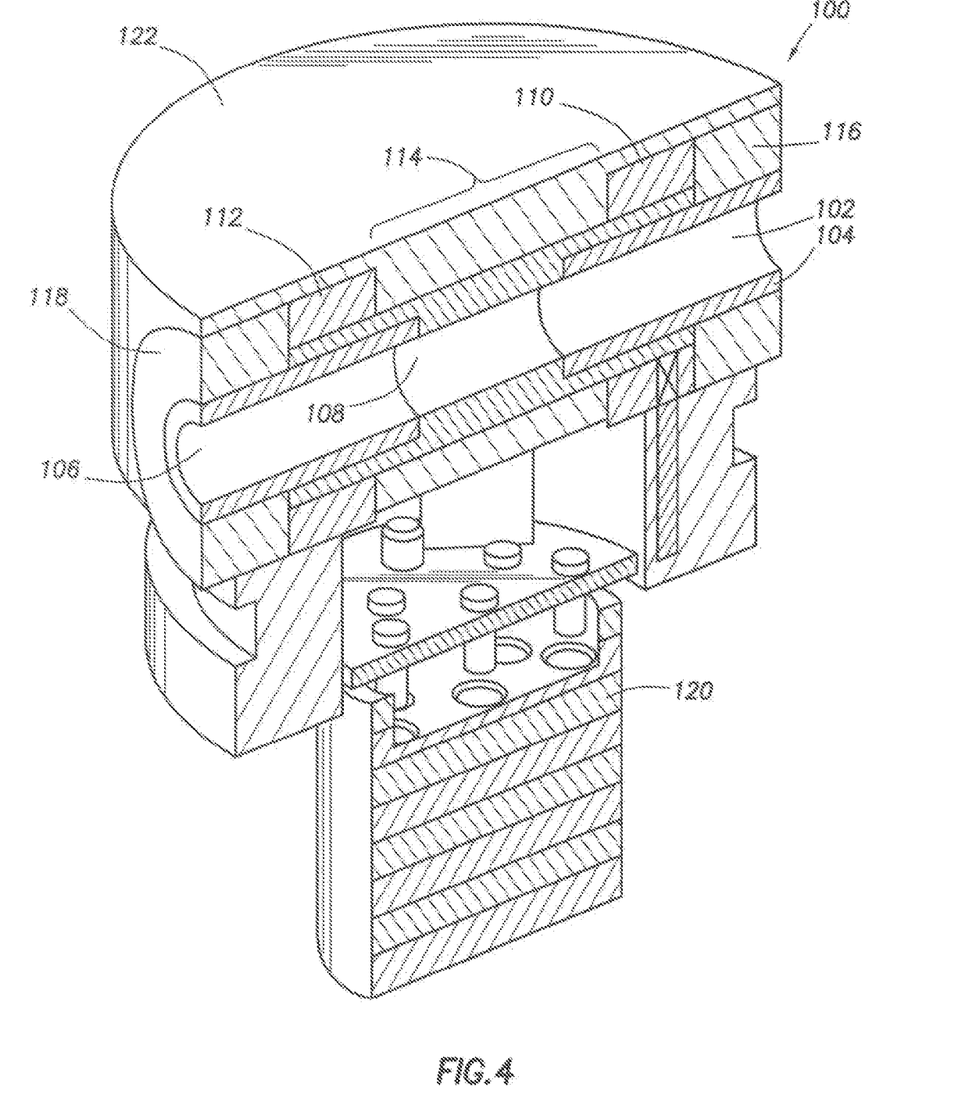
FIG. 4 shows a cross-sectioned schematic view of a fluid resistivity measurement apparatus in accordance with an embodiment of the present invention.

FIG. 4 shows a fluid resistivity measurement apparatus 100 in accordance with one embodiment of the invention. Resistivity measurement apparatus 100 is preferably constructed such that the resistivity of fluids flowing through a flow line 102 can be inductively measured. Fluid flow line 102 shown includes an inlet section 104 and an exit section 106 (corresponding to the conductive segments in FIG. 3) separated by an insulating section 108. Insulating section 108 prevents electric currents from traveling directly from inlet section 104 to exit section 106. Inlet and exit sections 104, 106 are preferably constructed of a high-strength material, such as metal, PEEK, ceramic, etc. As noted above, if these segments are made of non-conductive materials (e.g., PEEK or ceramic), the inner surface of the sections may be coated with a conductive material to provide electrical contacts with the fluid. These electrical contacts form part of the loop (shown as 38 in FIG. 3) that provides current return. Note that if the fluid input and output lines are made of metal, then the fluid input and output lines can provide electrical contacts with the fluid.

The resistivity measurement apparatus 100 also includes a pair of toroids 110 and 112 surrounding the flow line 102. The toroids 110 and 112 are separated axially by a spacing gap 114. End caps 116, 118 retain toroids 110, 112 within resistivity measurement apparatus 100. First toroid 112 may act to induce a current in the fluid flowing through the flow line 102 and second toroid 110 may detect that current (or induced voltage), or vice versa. Because toroids 110, 112 measure currents in the fluids indirectly without having to contact the fluid, they can perform their functions from outside the high pressure flow line. Resistivity measurement apparatus 100 includes an electronics package 120 to drive toroid 110 or 112 and make resistivity measurements or calculations. Because electronics package 120, toroids 110, 112, and all wires and leads therebetween are not exposed to the elevated pressures in the flow line 102, complex sealing and hydraulic isolation mechanisms are not necessary. Therefore, resistivity measurement apparatus 100 will be much more reliable in operation in that the risk of catastrophic failure in a hydraulic seal protecting electronics and sensors is minimized.

In this particular example, all components of resistivity measurement apparatus 100 are encased within a housing 122 that is adapted to fit within a measurement and testing device (e.g., an MDT™) for delivery to a downhole location. For such applications, the resistivity measurement apparatus 100 is preferably dimensioned to fit in an existing tool. In accordance with one embodiment of the invention, housing 122, for example, may be a 2.0-inch diameter cylindrical housing to fit in an MDT™ tool. A measurement and testing device of this size necessarily means that the diameter of the flow line 102 is small (e.g., less than 0.250" inches (0.6 cm)) in diameter. If a conventional electrode device were used, hydraulic seals needed to seal around the electrodes will necessarily be of very small dimensions and will likely have difficulty withstanding pressures exceeding 30,000 PSI and temperatures up to 200° C. By using toroids, it is possible to sequester all electronics from the elevated pressures and, therefore, no hydraulic seals are necessary.

As noted above, various configurations are possible for constructing a flow line having an insulating segment disposed between the two conductive segments. In one embodiment, a flow line may comprise an insulating section 108 made of glass (or other insulating materials, such as ceramic or PEEK (polyetheretherketone)) joined at both ends thereof by conductive sections (e.g., sections 104 and 106 in FIG. 4) that are made of metal. Glass to metal joints have been successfully used in downhole tools. Glass can provide the insulation and at the same time can withstand relatively high pressure. Other materials including, but not limited to, high-temperature plastics (e.g., PEEK) and ceramics may also be used.

Figure 5:
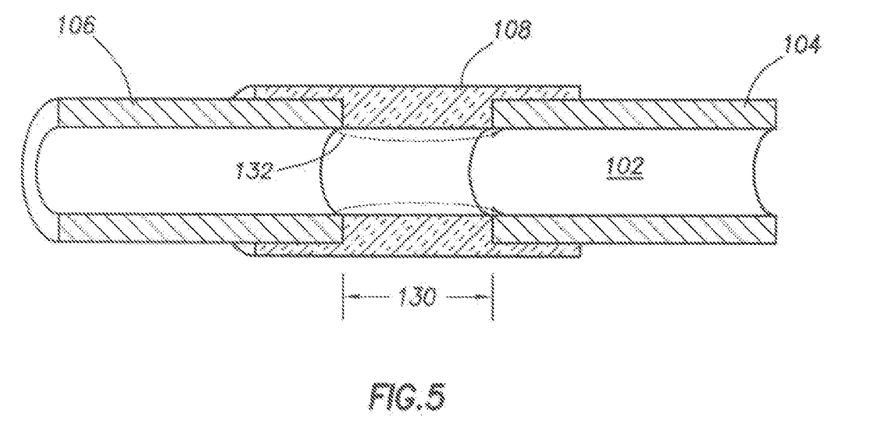
FIG. 5 shows a schematic cross-sectioned view of a fluid flow line in accordance with an embodiment of the present invention.

Referring to FIG. 5, a flow line 102 assembly similar to that of FIG. 4 is shown schematically. A glass to metal seal is formed between sections 104 and 106 such that the glass portion of the seal acts as the insulating section 108, whereby an insulated gap 130 exists between sections 104 and 106. When induced by toroid 112, electrical current (shown schematically by lines 132) flows between section 104 and section 106 in the fluid through the flow line 102. In the example shown in FIG. 5, the length of current flow 132 is approximately the same as the size of axial gap between sections 104 and 106. However, because glass portion 108 is of significantly less tensile and shear strength than metal section sections 104 and 106, the glass span is relatively more susceptible to radial stresses and breakage when highly pressurized fluids pass through flow line 102. This will also be true with a plastic insulating section. Therefore, it is desirable to reduce the axial span of the glass (or plastic) section.

Figure 6:
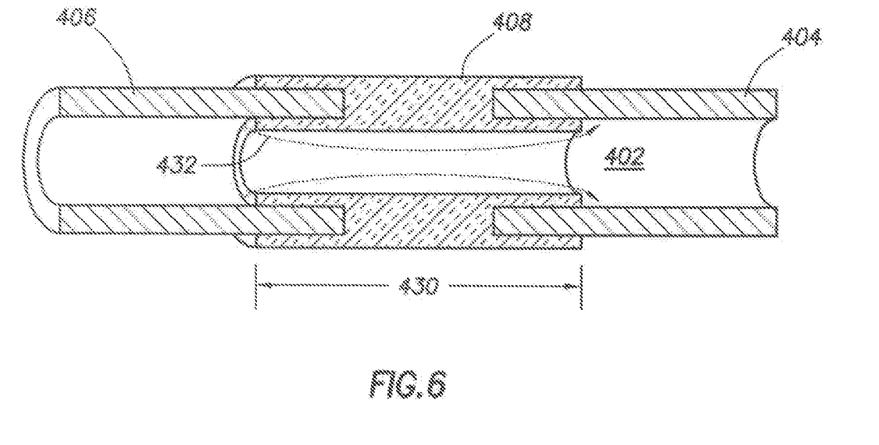
FIG. 6 shows a schematic cross-sectioned view of another fluid flow line in accordance with an embodiment of the present invention.

Referring now to FIG. 6, another flow line 402 is shown schematically. Flow line 402 includes conductive sections 404 and 406 that are axially closer together than that of FIG. 4. With less of an axial gap between sections 404 and 406, the radial stresses in the insulating section 408 is dramatically reduced. However, if the axial gap is reduced, the resistivity measurement may not be accurate because the measured resistance is a function of the insulating segment (l). Therefore, to compensate for the reduced axial span, the insulating section 408 may be extended along a length 430 on the inner surface of the flow line 402. The portion of insulating section 408 inside the bore of flow line 402 can be relatively thin, for example a light coating. Current flow 432 travels substantially the same distance as current flow 132 of FIG. 5, but the span of weak glass (or other material) within insulating section 408 is significantly reduced. Therefore, the insulating section 408 is much less susceptible to failure under heavy pressure loads than the insulating section 108 of FIG. 5.

Figure 7:
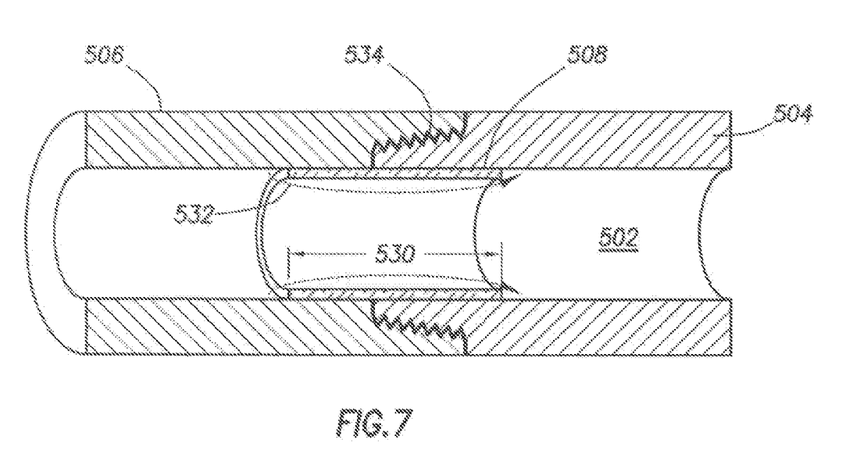
FIG. 7 shows a schematic cross-sectioned view of another fluid flow line in accordance with an embodiment of the present invention.

FIG. 7 shows a flow line 502 in accordance with another embodiment of the invention. In FIG. 7, the flow line 502 is primarily comprised of a first section 504 and a second section 506 joining together with a thread engagement, wherein an insulating coating exists on threads 534. The first section 504 and the second section 506 may be made of metal. The insulating coating on threads 534 effectively prevents electrical communication between section sections 504 and 506 and requires current 532 to flow through the fluid in the flow line 502. In order to extend the axial length that current 532 must travel, an insulating section 508 of length 530 is coated on the inner surface of the flow line 502. Insulating section 508 can be of any insulating material, such as glass, ceramic, rubber, PEEK, etc. Because insulating section 508 is backed by the metal sections 504 and 506, it should be able to withstand substantial radial stress from the high-pressure fluid in the flow line 502. The possibility of failure is minimized.

Figure 8:
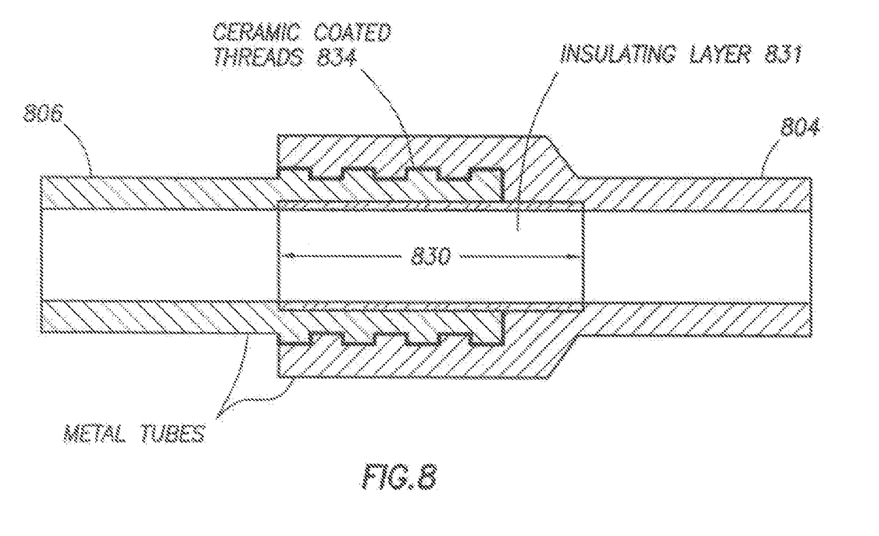
FIG. 8 shows a schematic cross-sectioned view of another fluid flow line in accordance with an embodiment of the present invention.

One of ordinary skill in the art would appreciate that variations of the embodiment shown in FIG. 7 are possible. For example, FIG. 8 shows an embodiment that has a thread connection, wherein an insulating material 834 (e.g., ceramic) is coated on either or both of the thread ends to prevent electrical communication between the fluid inlet 804 and outlet 806 lines. The ceramic coating is typically 0.010 to 0.020 inches (0.25–0.49 cm) thick. Ceramic coatings are available from vendors such as Praxair, Inc. The mechanical load from the internal pressure is carried by the metal tubes so that this design is very robust. The insulating region between the two metal tubes is obtained by adding an insulating layer 831, which can be a ceramic coating, a rubber layer molded onto the metal tubes, or an insert of plastic, glass, or PEEK. The insulating layer 831 having a length 830 forces the current to travel via the fluid column in this section.

Figure 9:
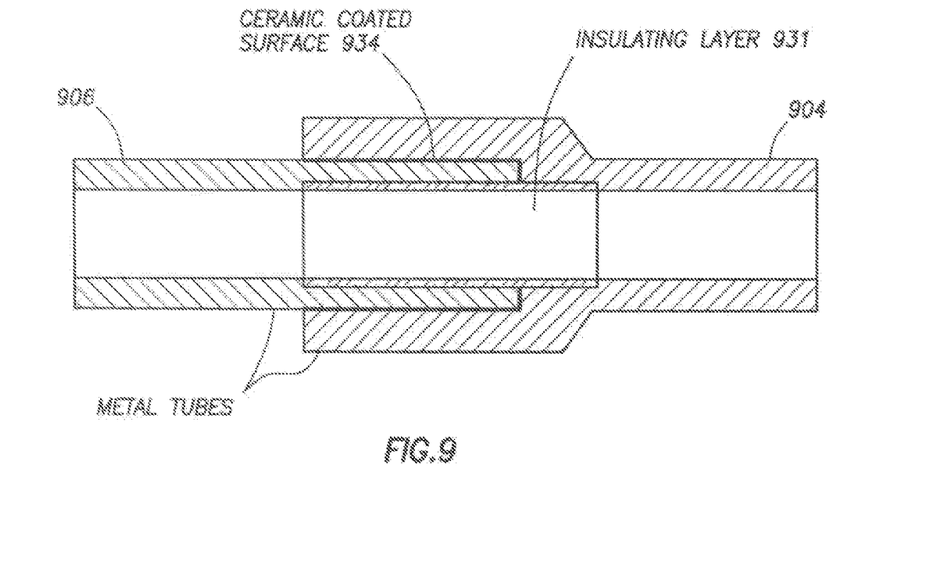
FIG. 9 shows a schematic cross-sectioned view of another fluid flow line in accordance with an embodiment of the present invention.

FIG. 9 shows a similar embodiment, but with a non-threaded coupling. As shown in FIG. 9, the fluid inlet 904 and outlet 906 lines are coupled by a shrink-fit mechanism. In assembling the two tubes, the outer metal tube is heated so as to expand it, which allows it to be slid over the inner tube. When the outer tube cools to the same temperature as the inner tube, the two tubes are compressed and form a pressure seal. The coupling region (on the inner tube, outer tube, or both) is coated with an insulating material 934, such as ceramic (typically with a thickness of 0.010–0.020 inches (0.25–0.49 cm), to prevent direct electrical communication between the inlet 904 and outlet 906 lines. An insulating layer 931 is coated on the inside of the tube to provide the insulating segment. Another possibility is to use O-ring seals in the coupling region rather than a heat shrink fit to provide a pressure barrier (not shown).

Figure 10:
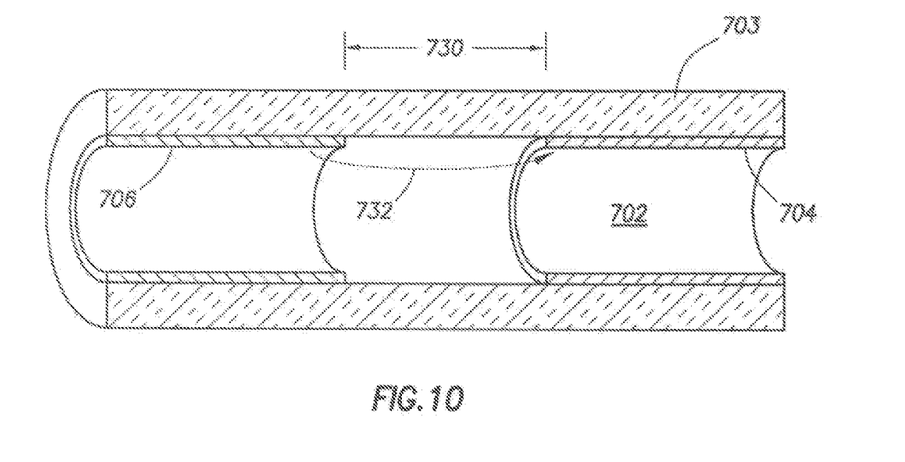
FIG. 10 is a schematic cross-sectioned view of another fluid flow line in accordance with an embodiment of the present invention.

FIG. 10 shows a flow line 702 in accordance with another embodiment of the invention. As shown in FIG. 10, the flow line 702 is mainly comprised of an insulating tube 703 that includes two sections of conductive coatings 704, 706. The conductive coating sections 704, 706 are separated by an uncoated section 730. The conductive coatings 704, 706 are connected externally by a wire or by the metal housing surrounding the sensor. The current 732 flows between the two conductive coatings.

Figure 12:
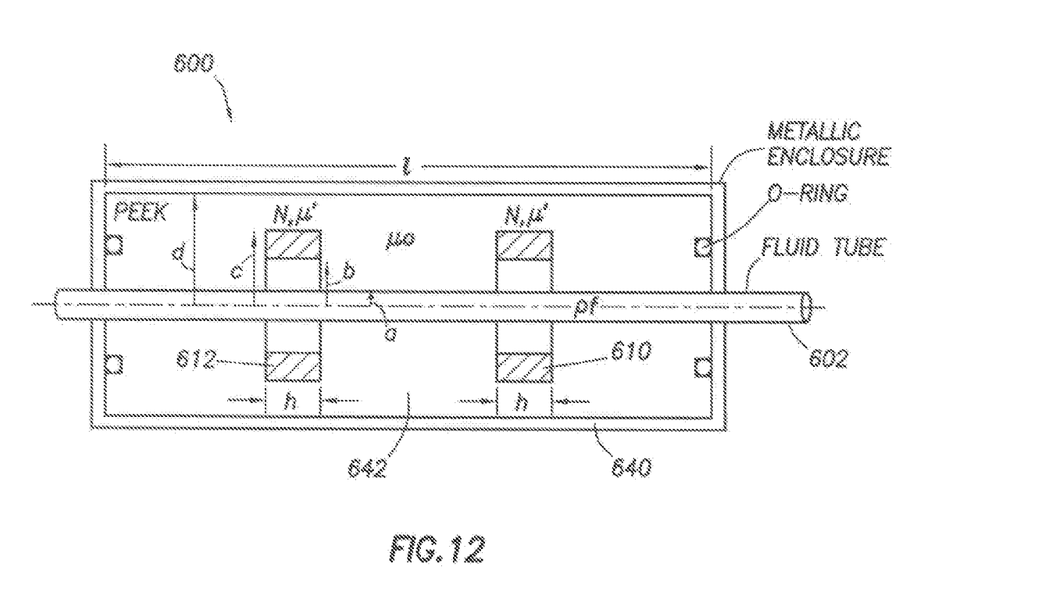
FIG. 12 shows a mechanical schematic drawing of a measurement apparatus in accordance with an embodiment of the present invention.

FIGS. 5–10 illustrate several flow lines in accordance with embodiments of the invention. These examples are for illustration only. One of ordinary skill in the art would appreciate that other modifications are possible without departing from the scope of the invention. For example, FIG. 12 shows a resistivity sensor in accordance with another embodiment of the invention, comprising a flow line 602 made of a non-conductive material (e.g., PEEK or ceramic) and a metal housing 640 that encloses the two toroids 610, 612. In this embodiment, the metal housing provides current return paths at points where the flow line 602 exits the metal housing 640. At these locations, the fluid comes in contact with metal fluid input and output flow lines.

Figure 11:
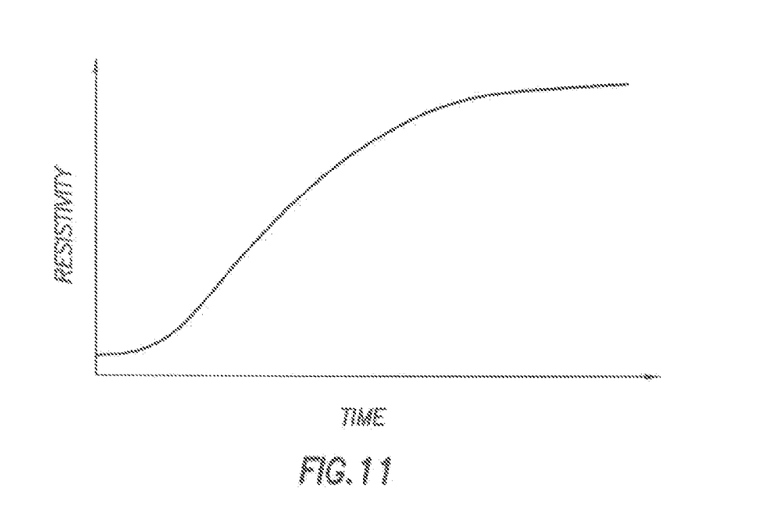
FIG. 11 shows a schematic that represents a resistivity curve that might be expected when a well is drilled with a water-based mud and when testing a zone containing oil.

A resistivity measurement apparatus in accordance with embodiments of the invention may be used to monitor resistivity changes, for example, while the formation fluids are being drawn in to a formation tester. When the resistivity reaches a steady state, it may be assume that the fluids being drawn into the formation tester are representative of virgin formation fluids, i.e., substantially free of the invaded drilling fluid. FIG. 11 shows a schematic that represents a resistivity curve that might be expected when a well is drilled with a water-based mud and when testing a zone containing oil. As shown, the initial resistivity of the fluids is highly influenced by the conductive drilling fluids that have invaded the formation. As more fluids are drawn into the formation tester, the proportion of the invaded drilling fluids decreases, while the proportion of the resistive virgin formation fluid increases. Eventually, the resistivity detected in the flow line is expected to approach that of the virgin formation fluids, i.e., approaching a steady state. Thus, a resistivity sensor of the invention may be used to monitor when the fluids drawn into a formation tester are representative of virgin formation fluids and, therefore, are suitable to be collected for later analysis.

In addition to "qualitative" applications described above with reference to FIG. 11, a resistivity measurement apparatus in accordance with embodiments of the invention may also be used to determine the resistivities of the fluids (quantitative applications).

Figure 13:
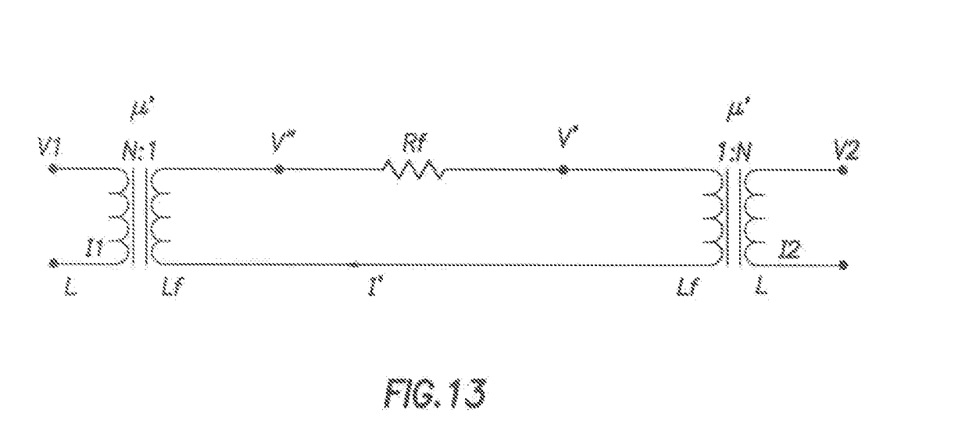
FIG. 13 shows an electrical schematic drawing of a circuit in accordance with an embodiment of the present invention.

Referring now to FIGS. 12 and 13, the physics behind the indirect measurement of fluid resistivity with two toroids will be described. FIG. 12 depicts a fluid resistivity cell 600 having two toroids 610, 612 to measure resistivity of fluids in a flow line 602 by inductive coupling. As described above in reference to FIG. 4, the first toroid 612 induces a current in the flow line 602 and the second toroid 610 measures the induced current. The flow line 602 shown in FIG. 12 is constructed of an electrically non-conductive tube having an internal radius a and a length l. The fluid resistivity cell 600 in FIG. 12 is encased within a cylindrical metallic housing 640 and includes a internal cavity 642 filled with a nonconductive material having a nominal magnetic permeability $\mu_o$, including, but not limited to atmospheric air, vacuum, or an insulating polymeric material (e.g. epoxy, rubber, fiber glass, plastic, PTFE or PEEK).

The magnitude of the current induced in flow line 602 depends on the resistivity of the fluid ($\rho_f$) flowing through the electrically non-conductive line 602 and various parameters of toroids 610, 612. Each toroid 610, 612 has a inner radius b, an outer radius c, a thickness h, a number of turns of wire wrapped thereupon N, and a permeability $\mu'$. Preferably, toroids 610, 612 have a high magnetic permeability $\mu'$ and can be manufactured of ferrite, iron powder, mu-metal, superalloy, or any other material appropriate for the operating frequency. The operating frequency may be any frequency that can induce a current in the fluids in the flow line, for example, in a range of 5 KHz to 200 MHz, preferably 20 KHz to 10 MHz, more preferably 20 KHz to 2 MHz. Furthermore, each toroid 610, 612 may include an electrostatic shield to eliminate/minimize any capacitive coupling or direct mutual inductive coupling between the toroids 610, 612.

The self inductance of toroids 610, 612, as shown in FIG. 12, can be characterized by $$L = \frac{\mu_0 \mu' N^2 h \ln(c/b)}{2\pi} \quad \text{(Eq. 1)}$$

where $\mu_0 = 4\pi \cdot 10^{-7}$ Henry/m. The mutual inductance between each toroid 610, 612 and the fluid in the flow line 602 can be described as:

$$M = \frac{\mu_0 \mu' N h \ln(c/b)}{2\pi}. \quad \text{(Eq. 2)}$$

The self-inductance of one half of the fluid-filled flow line 602 is $$L_f = \quad \text{(Eq. 3)}$$
$$\frac{\mu_0 \mu' h \ln(c/b)}{2\pi} + \frac{\mu_0 h}{2\pi}\left[\ln\left(\frac{bd}{ac}\right) + \frac{1}{4}\right] + \frac{\mu_0}{2\pi}(l/2-h)\left[\ln\left(\frac{d}{a}\right) + \frac{1}{4}\right]$$

where the first term dominates because $\mu' \gg 1$. Note that d is the inner radius of the metallic housing 640. As noted above, the resistance of the fluids in flow line 602 is a function of the resistivity of the fluid ($\rho_f$), the length of the fluid path (l), and the cross-sectional area of the tube ($A = \pi a^2$):

$$R_f = K\frac{\rho_f l}{\pi a^2}. \quad \text{(Eq. 4)}$$

Referring to FIG. 13, a known current $I_1$ (from a source with a voltage $V_1$) energizes first toroid 612, thereby inducing a current I' in fluid line 602, which returns through the metal end faces and the metal housing (see FIG. 12). This induced current I' produces a current $I_2$ (or voltage $V_2$) in the second toroid 610. The output of the second toroid 610 is attached to an operational amplifier (not shown), preferably with high input impedance.

The circuit model shown in FIG. 13 can be used to illustrate the processes involved in solving for $R_f$ and, hence, $\rho_f$. For the first toroid 612, $$V_1 = j\omega L I_1 - j\omega M I' \quad \text{(Eq. 5)}$$

$$V^* = -j\omega L_f I' + j\omega M I_1. \quad \text{(Eq. 6)}$$

For the second toroid 612, $$V' = j\omega L_f I' + j\omega M I_2 \quad \text{(Eq. 7)}$$

$$V_2 = j\omega L I_2 + j\omega M I'. \quad \text{(Eq. 8)}$$

For fluid line 602, $$V'' = V' + I' R_f \quad \text{(Eq. 9)}$$

Solving for $V_2$ yields, $$V_2 = j\omega\left[L - \frac{M^2}{2L_f - j(R_f/\omega)}\right]I_2 + j\omega\left[\frac{M^2}{2L_f - j(R_f/\omega)}\right]I_1 \quad \text{(Eq. 10)}$$

where both terms have loss and reactance. If $V_2$ is measured with a sufficiently high impedance operational amplifier, then it can be assumed that $I_2$ is zero, and the above equation reduces to $$V_2 = -\omega^2\left(\frac{M^2}{R_f + j2\omega L_f}\right)I_1. \quad \text{(Eq. 11)}$$

Substituting the self-inductance into the above equation gives the relationship between the measured quantities for $V_2$ and $I_1$ and the desired quantity $R_f$ as follows:

$$\frac{V_2}{I_1} = \frac{-\omega^2 \mu_0^2 (\mu')^2 N^2 h^2 \ln^2(c/b)}{4\pi^2}\left(\frac{1}{R_f + j2\omega L_f}\right). \quad \text{(Eq. 12)}$$

This equation can now be inverted and combined with Equation 4 to find $R_f$ and $\rho_f$. It should be noted that the relative magnetic permeability ($\mu'$) is a squared term in the numerator of Equation 12, and it also appears in the denominator as a component of $L_f$ (see Equation 3).

The relative magnetic permeability $\mu'$ of toroids 610, 612 may be temperature-dependant and, therefore, may need to be calibrated over the operating temperature range. If the temperature variation of $\mu'$ is small and predictable, then a temperature-dependent correction can be applied to the reading, if necessary. One approach is to measure the permeability $\mu'$ of the toroids at various temperatures prior to deployment downhole. Once in position, a sensor in the fluid resistivity cell 600 may measure the temperature and insert a correction factor from a look-up table into the calculation.

Figure 14:
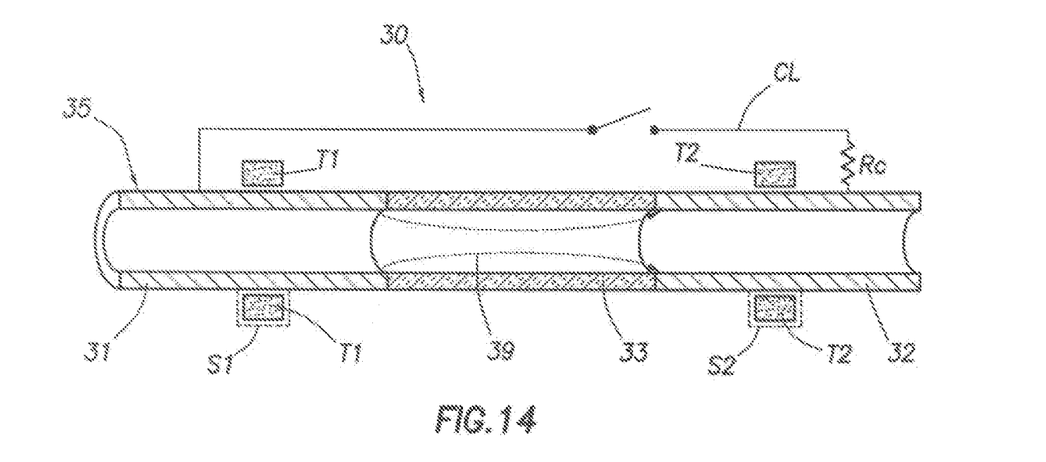
FIG. 14 shows a resistivity measurement device including a calibration loop or secondary windings on the toroids for calibration in accordance with one embodiment of the invention.

If the temperature variation of $\mu'$ is large or unpredictable, it may be necessary to include a calibration function into the system. One approach is to add secondary windings (S1, S2 in FIG. 14) to each toroid 610, 612, so that these toroids may be calibrated by injecting a known current and by measuring the voltage induced thereby. Secondary windings (e.g., S1) can also be used to monitor applied voltage (e.g., $V_1$). Another approach would be to pass a conductor (e.g., a conductor wire or calibration loop (CL in FIG. 14)) through both toroids 610, 612 parallel to fluid line 602. The calibration loop (CL) is in series with a known resistance $R_c$ and a switch to open and close the circuit. The voltage $V_2$ could be measured with the calibration loop both open and closed. In this case, the open loop measurement is:

$$X = -k\mu'^2(G) \quad \text{(Eq. 13)}$$

and the closed loop measurement is:

$$Y = k\mu'^2(G+S), \quad \text{(Eq. 14)}$$

where $$G = \frac{1}{R_f + j2\omega L_f},\quad (Eq.\ 15)$$

and $$S = \frac{1}{R_c} \quad (Eq.\ 16)$$

X and Y are measured quantities, S is known, and G and μ' are unknowns. Solving the above Equations 13–16 results in $$G = \frac{S}{(Y/X - 1)}.$$

Note the overall system (see FIG. 13) resistance depends not only on the fluid resistance ($R_f$) in the flow line, but also on the efficiency of the inductive coupling between the fluid and the toroids. Inductive coupling efficiency depends on the frequency (ω) and the inductance of the fluid ($L_f$). In order to have reliable measurement of the fluid resistivity ($\rho_f$), it is preferable that the system design and the operating frequency are chosen so that $R_f \geq \omega L_f$. In designing a system, it is important to keep in mind that $\mu_f$ and $R_f$ may vary over many orders of magnitude. This point is particularly important when measuring low resistivity fluids, such as water-based mud or formation water.

In practice, the toroidal fluid resistivity cell could be operated with an ideal voltage drive for V1 and an ideal current measurement of I2, in which case we can write the expression $$\frac{V1}{I2}C = R_f,$$

where $$C = \frac{V1}{I2}\frac{1}{R_{cal}}.$$

Here C is the calibration factor found by measuring the response of a wire loop run through the two toroid with a known resistance $R_{cal}$. The calibration resistor is assumed to be a precision resistor with a temperature stability of 5 ppm/C.

The above description uses a formation tester to illustrate embodiments of the invention. One of ordinary skill in the art would appreciate that embodiments of the invention may also be used in other applications, such as open hole wireline tools, cased hole wireline tools (e.g., cased hole dynamic tester, CHDT™, a trademark of Schlumberger Technology Corp. (Houston, Tex.)), logging-while-drilling tools, permanent monitoring (in both downhole and surface equipment), and in other flow lines (particularly, those subjected to high pressures).

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An apparatus for measuring fluid resistivity, comprising:
    being adapted to be in fluid communication with formation fluids, wherein the flow line includes a first section comprising a first conductive area, a second section comprising a second conductive area, and an insulating section disposed between the first and the second section to prevent direct electrical communication between the first section and the second section, wherein the first conductive area and the second conductive area are configured to contact a fluid contained in the flow line such that, together with a conductive path disposed outside the flow line, a current return loop is formed;
    a first toroid and a second toroid surrounding the flow line, wherein the first toroid is configured to induce an electrical current in the fluid in the flow line and the second toroid is configured to measure the electrical current induced in the fluid in the flow line; and
    an electronic package to control functions of the first toroid and the second toroid.

2. The apparatus of claim 1, wherein the first section and the second section of the flow line each comprise a metallic tube.

3. The apparatus of claim 1, wherein the insulating section is made of a material selected from glass, ceramic, and PEEK.

4. The apparatus of claim 1, wherein the first section and the second section of the flow line are joined by thread engagement, wherein an insulating coating is disposed on a thread region of the first section, a thread region of the second section, or both thread regions of the first section and the second section.

5. The apparatus of claim 1, wherein the first section and the second section of the flow line are joined by heat shrink or force fit, wherein an insulating coating is disposed on a coupling region of the first section, on a coupling region of the second section, or on both coupling regions of the first section and the second section.

6. The apparatus of claim 1, wherein the first section, the second section, and the insulating section of the flow line comprises a continuous tube made of an insulating material, and wherein the first conductive area of the first section and the second conductive area of the second section each comprise a coating of a conductive material on an inner surface of the flow line.

7. The apparatus of claim 1, further including a calibration loop disposed alone the flow line for calibration of the first toroid and the second toroid, wherein the calibration loop can be switched on and off.

8. The apparatus of claim 1, wherein the first toroid and the second toroid include calibration windings.

9. The apparatus of claim 1, wherein the apparatus is disposed in a formation tester.

10. An apparatus for measuring fluid resistivity, comprising:
    a flow line adapted to be in fluid communication with formation fluids, wherein the flow line is made of an insulating material;
    a first toroid and a second toroid surrounding the flow line and spaced apart along the flow line, wherein the first toroid is configured to induce an electrical current in a fluid contained in the flow line and the second toroid is configured to measure the electrical current induced in the fluid;

a metallic housing enclosing the first toroid, the second toroid, and a section of the flow line, wherein the metallic housing is configured to provide a return current path for the electrical current induced in the fluid; and an electronic package to control functions of the first toroid and the second toroid.

11. The apparatus of claim 10, further comprising a calibration loop disposed along the flow line.

12. The apparatus of claim 10, wherein the first toroid and the second toroid include calibration windings.

13. A method for measuring resistivity of a formation fluid in a borehole, comprising:

flowing the formation fluid through a flow line of a resistivity measurement apparatus, the flow line including a first section comprising a first conductive area, a second section comprising a second conductive area, and an insulating section between the first conductive section and the second conductive section such that the first conductive area and the second conductive area are disposed about and contact the formation fluid flowing in the flow line and are configured such that, together with a conductive path disposed outside the flow line, a current return loop is formed;

inducing an electrical current in the formation fluid in the flow line using a first toroid; and measuring the electrical current induced in the formation fluid with a second toroid.

14. The method of claim 13, further determining a resistivity of the formation fluid from measurement made with the second toroid.

15. The method of claim 13, further comprising calibrating the first toroid and second toroid with a calibration loop disposed along the flow line.

16. The method of claim 13, further comprising calibrating the first toroid and second toroid with calibration windings included in the first toroid and the second toroid.

* * * * *